(No Model.)

M. ROBINSON.
HOPPLE.

No. 579,723. Patented Mar. 30, 1897.

WITNESSES
J. W. Danielson Jr.
C. Gerst

INVENTOR
Miles Robinson
BY
Edgar Gale & Co
ATTORNEYS

UNITED STATES PATENT OFFICE.

MILES ROBINSON, OF PEOTONE, KANSAS.

HOPPLE.

SPECIFICATION forming part of Letters Patent No. 579,723, dated March 30, 1897.

Application filed October 28, 1896. Serial No. 610,346. (No model.)

*To all whom it may concern:*

Be it known that I, MILES ROBINSON, a citizen of the United States, and a resident of Peotone, in the county of Sedgwick, State of Kansas, have invented certain new and useful Improvements in Antikicking Attachments for Cows, of which the following is a specification, reference being had to the accompanying drawings, forming a part thereof, in which similar numerals of reference indicate corresponding parts wherever found throughout the several views.

This invention relates to antikicking attachments for cows; and the object of the invention is to provide an improved attachment of this class, which consists of a suitable clamp which is adapted to be connected with the leg of a cow, so as to prevent her from kicking while being milked.

The invention is fully disclosed in the following specification, of which the accompanying drawings form a part, in which—

Figure 1:
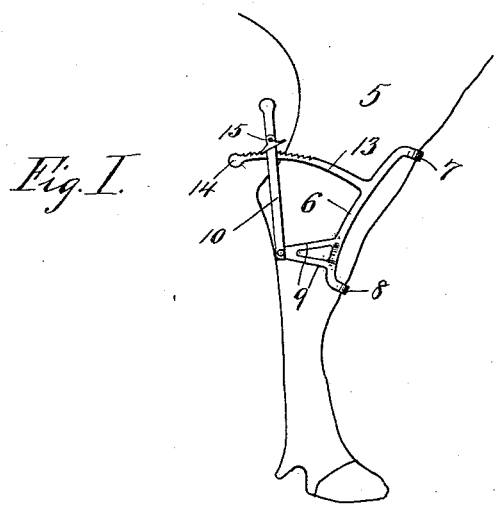
Figure 2:
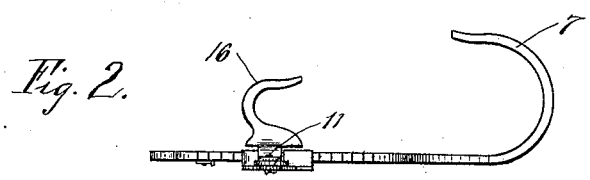
Figure 3:
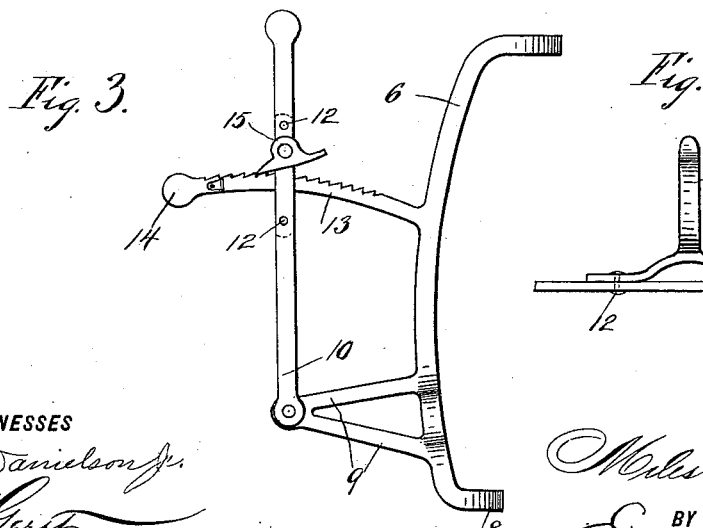
Figure 4:
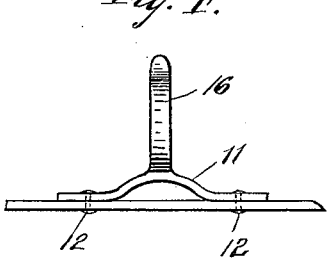

Figure 1 is a side view of the leg of a cow provided with my improved attachment; Fig. 2, a plan view, on an enlarged scale, of the attachment removed; Fig. 3, a side view thereof, and Fig. 4 a back view of a portion thereof.

My improved attachment consists of a clamp which is adapted to be secured to the leg of a cow and to press upon the front thereof above and below the knee-joint, and in the drawings forming part of this specification I have shown at 5 in Fig. 1 the leg of a cow and the method of connecting my improved knee clamp or attachment thereto. Said knee clamp or attachment consists of a curved plate or bar 6, which is provided at its upper end with a yoke-shaped and backwardly-directed hook 7 and at its lower end with a similar hook 8, and near the lower end thereof are two backwardly-directed arms or braces 9, to which is pivoted a lever 10, to one side of which is secured a keeper 11, said keeper being bolted to the lever, as shown at 12, and passing through said keeper is a segmental or curved rack-bar 13, which is secured to or formed on the plate or bar 6, and the outer end of which is provided with a knob or head 14, and pivotally connected with the lever 10 is a dog 15, which operates in connection with said rack-bar. The keeper 11 is provided with a hook 16, which projects forwardly when the attachment is in place upon the leg of a cow, while the hooks 7 and 8 project backwardly.

The operation will be readily understood from the foregoing description when taken in connection with the accompanying drawings and the following statement thereof.

The attachment is placed upon the leg of a cow, as shown in Fig. 1, in such position that the hooks 7 and 8 press upon the front of the leg at equal distances above and below the knee-joint, while the hook 16 presses upon the back of the leg above the knee-joint, and by moving the upper end of the lever 10 forwardly the hook 16 may also be moved forwardly, so as to clamp the leg of the cow as tightly as desired, and the lever 10 is held in any desired position by the dog 15, which operates in connection with the rack-bar 13. When the device is thus connected with the leg of a cow, it will be impossible for the latter to kick, and my improvement will be found of great advantage, especially in connection with young cows and those which are in the habit of kicking while being milked.

This device is simple in construction and operation and will not harm the cow, and when in position also has a tendency to cause the cow to stand still.

The device is also comparatively inexpensive and is not liable to get out of order, and when properly made will fit the leg of any cow without change therein.

Having fully described my invention, I claim as new and desire to secure by Letters Patent—

An antikicking attachment for cows comprising a clamp having a curved plate, a yoke-shaped backwardly-directed hook at both its upper and lower ends, two backwardly-directed arms or braces near the lower end of the plate, a lever pivoted thereto, a keeper on said lever, a segmental rack-bar passing through said lever and engaging said curved plate, a head on the outer end of said rackbar, a dog on said lever engaging said rackbar and a hook on said keeper, all of said parts being combined substantially as described.

In testimony that I claim the foregoing as my invention I have signed my name, in presence of the subscribing witnesses, this 28th day of September, 1896.

MILES ROBINSON.

Witnesses:
GEORGE HENDERSON,
PAUL E. GRAHAM.